United States Patent
Ozawa et al.

(10) Patent No.: US 7,699,541 B2
(45) Date of Patent: *Apr. 20, 2010

(54) OPTICAL FIBER FUSION SPLICER AND METHOD FOR ESTIMATING A SHAPE OF BEAM DISCHARGED BY THE OPTICAL FIBER FUSION SPLICER

(75) Inventors: Koji Ozawa, Sakura (JP); Hiroyuki Taya, Sakura (JP)

(73) Assignee: Fujikura Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/353,645

(22) Filed: Jan. 14, 2009

(65) Prior Publication Data
US 2009/0136186 A1 May 28, 2009

Related U.S. Application Data

(62) Division of application No. 10/091,646, filed on Mar. 5, 2002, now Pat. No. 7,494,288.

(30) Foreign Application Priority Data
Jun. 27, 2001 (JP) ............................. 2001-194320

(51) Int. Cl.
*G02B 6/255* (2006.01)

(52) U.S. Cl. ........................................... 385/96; 385/98
(58) Field of Classification Search .............. 385/95–99; 219/121.11, 121.12, 121.13, 121.14, 121.38, 219/121.45, 121.46, 121.58, 121.59, 121.63
See application file for complete search history.

(56) References Cited

U.S. PATENT DOCUMENTS

| | | | | |
|---|---|---|---|---|
| 5,570,446 A | * | 10/1996 | Zheng et al. | 385/98 |
| 6,428,218 B1 | * | 8/2002 | Mussig | 385/96 |
| 6,799,903 B2 | * | 10/2004 | Saito et al. | 385/96 |

* cited by examiner

*Primary Examiner*—Daniel Petkovsek
(74) *Attorney, Agent, or Firm*—K&L Gates LLP

(57) ABSTRACT

The present invention is provided for fusion splicing optical fibers with low splice loss even when a shape of a discharge beam for the splicing is distorted. In the present invention, a preliminary discharge is performed with the optical fibers outside a discharge area and an image of the discharge beam thereof is picked up. Based on this image, brightness distributions of the discharge beam are estimated on a plurality of lines in a Z direction that are set in different positions in an X direction, and a discharge center of the beam is found from the plurality of brightness distributions. Then, the abutment portion of the optical fibers is positioned at the discharge center, and a main discharge is performed so as to fusion splice the distal ends of the optical fibers.

1 Claim, 3 Drawing Sheets

OPTICAL FIBER FUSION SPLICER AND METHOD FOR ESTIMATING A SHAPE OF BEAM DISCHARGED BY THE OPTICAL FIBER FUSION SPLICER

CROSS REFERENCES TO RELATED APPLICATIONS

The present application is a divisional of U.S. patent application Ser. No. 10/091,646, filed on Mar. 5, 2002, issued as U.S. Pat. No. 7,494,288 B2 on Feb. 24, 2009, and claims priority to Japanese Patent Application JP 2001-194320 filed in the Japanese Patent Office on Jun. 27, 2001, the entire contents of which are incorporated herein by reference.

BACKGROUND

1. Field of the Invention

The present invention relates to an optical fiber fusion splicer that abuts the respective end surfaces of two optical fibers that are to be spliced against each other and fusion splices these optical fibers by heating the abutment portion by arc discharge, and to a method for estimating a shape of a beam which is discharged by the optical fiber fusion splicer.

2. Description of the Related Art

Optical fiber fusion splicers first abut the respective end surfaces of two optical fibers that are to be spliced against each other and then fusion the two end surfaces by heating the abutment portion by arc discharge, resulting in the two optical fibers becoming fusion spliced. In this optical fiber fusion splicer, in order to be able to always make a stable splicing with little splice loss, it is essential that both of the end surfaces of the two optical fibers being spliced are heated uniformly. Namely, it is necessary that the two optical fibers be set such that the discharge beam is applied equally to both optical fibers. Therefore, conventionally, first a central position of the discharge beam is estimated and the optical fibers are abutted against each other in accordance with that position.

The following conventional methods are known as methods for estimating the central position of a discharge beam. In the first method, the distal ends of a pair of discharge electrodes that generate arc discharge in order to melt and thereby fusion splice the end surfaces of the optical fibers are observed, and the observer estimates the discharge central position on the supposition that the discharge central position is positioned over a straight line between the two distal ends.

In the second method, after two optical fibers have been abutted against each other between discharge electrodes, an arc discharge is generated for a set time so that the respective distal ends of the two optical fibers are melted by the heat therefrom. At this time, the positions of the distal ends of the optical fibers regress due to the surface tension created by the melting of the distal ends. Because it would appear logical that the amount by which they regress corresponds to the amount of the melting, namely, to the amount of the heating, the amounts that the distal ends of the two optical fibers regress are measured and the center position is estimated by calculating the central position of the discharge beam relatively from the difference in the regression amounts.

In the third method, after the respective end surfaces of the two optical fibers being spliced have been abutted against each other, the abutment portion is heated by arc discharge causing both end surfaces to melt and the two optical fibers to thus be fusion spliced. At the time of this discharge, an image of the discharge beam is picked up and the brightness distribution on one line in a direction crossing a direct line between the discharge electrodes is estimated, and the central position of the discharge beam is estimated from the brightness distribution (Japanese Patent Application, First Publication No. 2-28605).

However, all of the above conventional methods have the following problems. In the first method, while it is necessary to observe the distal ends of the discharge electrodes, this cannot be done with a device in which the distal ends of the discharge electrodes cannot be observed due to the structure of the optical fiber fusion splicer. In a normal optical fiber fusion splicer an image pickup device such as a TV camera is provided for observing the abutment portion. However, this image pickup device is for observing the abutting optical fiber distal ends and observing whether they are aligned and the like, and in many cases the electrode distal ends are outside the field of vision and an image thereof cannot be picked up. Moreover, even if the electrode distal ends can be temporarily observed, if foreign substance such as dust is stuck to the distal end of an electrode or if the distal end is worn and the shape thereof is not uniform, then the actual shape of the discharge beam becomes irregular so that it cannot be guaranteed that the straight line between the distal ends of the discharge electrodes will be in the center of the discharge beam. Therefore, even if the optical fibers are abutted against each other in a position that has been estimated in this way, it is not possible to heat the distal ends of both optical fibers equally.

In the second method, before the two optical fibers are actually fusion spliced, because the distal ends thereof are first heated and the regression amounts measured, it is not possible to simply reheat the distal ends to perform the fusion splicing. If the distal ends are melted so that they become rounded and then regress, it is necessary to cut off the melted distal ends and to perform the splicing by heating and melting a new cut end surface. Therefore, it is necessary to perform the processing (i.e. removal of the covering, cleaning, and cutting) of the end surfaces of the two optical fibers twice: once for the measuring of the regression amount and once for the fusion splicing, creating the problem of extended time and labor. Moreover, if the discharge is too weak, the distal ends of the optical fiber do not melt sufficiently, resulting in the regression amount difference becoming indistinct and it not being possible to accurately estimate the discharge central position. In contrast, if the discharge is too strong, then both distal ends of the optical fibers become over melted which also results in the regression amount difference becoming indistinct and it not being possible to accurately estimate the discharge central position.

In the third method, because the discharge central position is estimated during the discharge for the fusion splicing, it is not possible to ascertain the discharge central position prior to the discharge for the fusion splicing. Because it is assumed that the discharge central position estimated at the time of the discharge for the previously performed fusion splicing is the same as for the current fusion splicing, if that assumption is not true, then this method is no longer applicable and the quality of the splicing cannot be guaranteed even if the abutment position of the current optical fibers is aligned with the previously estimated discharge central position. Furthermore, because in the third method, the brightness distribution on one line in the picked up discharge beam image is measured so as to estimate the discharge center, there is no way to deal with cases such as when the discharge beam state is slanted or distorted by deterioration of the electrode distal ends or by a condition of dust adhesion, and an accurate central position cannot be estimated.

Moreover, if the image of the discharge beam is observed in a state in which the optical fibers are placed inside the discharge area, a difference is generated between the brightness of the portion where the optical fibers are present and the brightness of the portion where the optical fibers are not present. In addition, if dust or the like adheres to the optical fiber, the brightness of that portion alone changes markedly resulting in the discharge central position being erroneously estimated.

In view of the above circumstances, it is an object of the present invention to provide an optical fiber fusion splicer that has been improved to the point where it allows a discharge central position to be accurately estimated without requiring added labor or time, and allows both distal ends of the two optical fibers being spliced to be heated equally and to perform the fusion splicing with a low level of splice loss.

It is a further object of the present invention to provide a discharge beam estimating method in which the shape of the discharge beam in an optical fiber fusion splicer is estimated resulting not only in it becoming possible to control the splice loss within a low level, but also in it being possible to detect abnormalities such as electrode deterioration, dust adhesion and the like.

SUMMARY

In order to achieve the above objects, the first aspect of the present invention is an optical fiber fusion splicer comprising: a setting means for setting respective end surfaces of two optical fibers that are to be spliced in order to abut against each other; a heating means for generating an arc discharge between two discharge electrodes and heating an abutment portion of the optical fibers using a discharge beam; an image pickup means for picking up an image of the discharge beam; and a control means for measuring, from image signals obtained by the image pickup means when a preliminary arc discharge is generated between the discharge electrodes when no optical fibers have been placed in a discharge area, brightness distributions on a plurality of lines that are set at different positions along a rectilinear direction between the discharge electrodes and run in a direction substantially at right angles to the rectilinear direction, estimating a heating center horn the plurality of brightness distributions, subsequently controlling the setting means such that the abutment portion of the two optical fibers is positioned in the heating center; and thereafter controlling the heating means such that a main arc discharge is generated and the abutment portion is heated by the discharge beam.

In the optical fiber fusion splicer, an image of the discharge beam is picked up and on that image a plurality of lines substantially at right angles to a straight line between the discharge electrodes are set such that each line is at a different position from the other lines along the rectilinear direction between the discharge electrodes, and the brightness distribution on each line is estimated. Namely, the positions of the plurality of lines used to estimate the brightness distributions are all different from each other. Therefore, even if the discharge beam is slanted or distorted due to the discharge electrodes being damaged or having dust or the like adhered thereto, it is possible for such an irregular shape of the discharge beam to be picked up and the heating center accurately estimated, Moreover, because the position of the abutment portion of the optical fibers is adjusted to match the heating center that has been thus estimated, the end surfaces of the two optical fibers can be heated equally resulting in fusion splicing being made with a low splice loss. Furthermore, because the preliminary arc discharge is performed for measurement prior to the main arc discharge for the fusion splicing, it becomes possible to set the optical fibers in the optimum position in the fusion splicing. Moreover, although both the preliminary arc discharge and the main arc discharge are performed for the above reason, during the preliminary arc discharge that is performed first, the optical fibers are not positioned within the discharge area and so do not become melted. Therefore, it is possible to avoid the complexities, labor, and length of time required if the end surface processing has to be performed twice. In addition, because it is not necessary to observe the distal ends of the discharge electrodes, the present invention can even be applied to an optical fiber fusion splicer in which it is not possible for structural reasons for the image pickup device to observe the distal ends of the discharge electrodes.

The second aspect of the present invention is the optical fiber fusion splicer according L to the first aspect, wherein the control means controls the heating means such that the preliminary arc discharge in which the brightness distributions are estimated is performed with the current during the preliminary arc discharge smaller than the current during the main arc discharge in which the abutment portion is heated.

Because the main arc discharge is performed in order to heat the abutment portion, the current for the main arc discharge is affected by various conditions and is generally quite large. Therefore, if the same current is also used for the preliminary arc discharge, the brightness of the picked up image of the discharge beam increases so that the brightness level exceeds the level where it is capable of undergoing image processing. Therefore, if the preliminary arc discharge is performed with the current set smaller than the current used in the main arc discharge, the brightness level does not reach saturation and it is possible to accurately estimate the heating center from the brightness distribution on each line, thereby simplifying the image processing.

The third aspect of the present invention is a discharge beam estimating method, wherein in an optical fiber fusion splicer comprising: a setting means for setting respective end surfaces of two optical fibers that are to be spliced in order to abut against each other; and a heating means for generating an arc discharge between two discharge electrodes and heating an abutment portion of the optical fibers using a discharge beam, an image of the arc discharge generated between the discharge electrodes when no optical fibers have been placed in a discharge area is picked up, brightness distributions on a plurality of lines that are set at different positions along a rectilinear direction between the discharge electrodes and run in a direction substantially at right angles to the rectilinear direction are estimated on the image, and a discharge beam shape is estimated from the plurality of brightness distributions.

The arc discharge is generated in a cylindrical shape as if to connect the discharge electrodes. Because the image of the discharge beam is obtained by picking up an image of this cylindrical positive column, the central axis thereof normally matches a straight line between the discharge electrodes. However, if the discharge electrodes deteriorate and become worn or have dust or the like adhering thereto, then this causes the discharge beam to be slanted or distorted. Therefore, if only one line were used to estimate the brightness distribution on the image of the discharge beam, it would not be possible to notice the distortions in the shape. For this reason, as is described above, in the image of the discharge beam, a plurality of lines substantially at right angles to the direct line between the discharge electrodes are set such that each line is at a different position from the others in a rectilinear direction between the discharge electrodes and the brightness distribution is estimated on each of these lines. Namely, a plural number of lines are used for measuring the brightness distribution and the position of each line is made different from the position of each of the other lines. As a result, even if the discharge beam is slanted or distorted, the shape thereof can be accurately estimated. This enables the center of the heating by the arc discharge to be accurately estimated and abnormal states such as a deterioration of the discharge electrodes or foreign matter such as dust being adhered to the discharge electrodes to be detected, which can be utilized when maintenance is carried out, thereby simplifying the maintenance of the discharge beam or the like.

Additional features and advantages are described herein, and will be apparent from the following Detailed Description and the figures.

DETAILED DESCRIPTION

Figure 1:
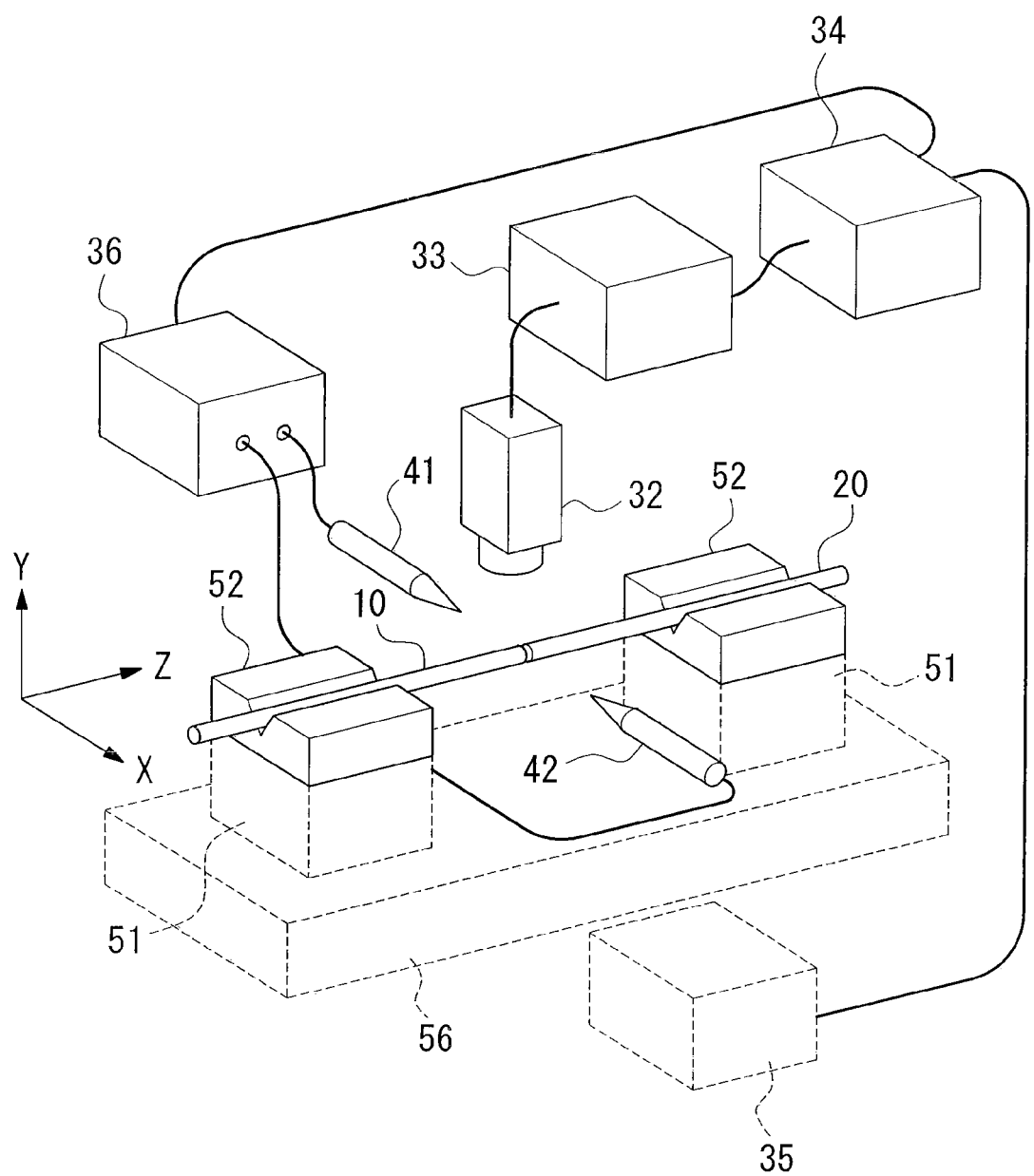
FIG. 1 is an upper perspective view schematically showing an embodiment of the present invention.

A detailed description will be given of an embodiment of an present invention with reference made to the accompanying drawings. FIG. 1 is an upper perspective view schematically showing the optical fiber fusion splicer according to an embodiment of the present invention. In FIG. 1, V groove blocks 52 (setting means) are used for setting in position each of two optical fibers 10 and 20 that are to be spliced, and are mounted on top of moving blocks 51. The moving blocks 51 are capable of movement in the three axial directions X, Y, and Z. Note here that the axial direction (horizontal direction) of the optical fibers 10 and 20 is taken as the Z direction, a horizontal direction at a right angle to the axis of the optical fibers 10 and 20 is taken as the X direction, and a vertical direction at a right angle to the axis of the optical fibers 10 and 20 is taken as the Y direction. The moving blocks 51 are mounted on a base 56 and are moved on the base 56 by a drive device 35 in the X, Y, and Z directions.

Discharge electrodes (rods) 41 and 42 which provide heating means are positioned in this case facing each other in the X direction and are fixed by a suitable mechanism that has been omitted from the drawings. High voltage is supplied from a discharge power supply device 36 to the discharge electrodes 41 and 42 so that an arc discharge is generated between the discharge electrodes 41 and 42. The abutment portion of the optical fibers 10 and 20 is heated by the heat from this arc discharge and fusion spliced.

A TV camera (image pickup means) 32 is disposed so as to pick up an image of the abutment portion of both optical fibers 10 and 20. An image signal output from the TV camera 32 is fed to an image processing device 33 and an image processing is performed. Information obtained by this image processing is fed to a control device (control means) 34 resulting in the drive device 35 and the discharge power supply device 36 are controlled.

Figure 2:
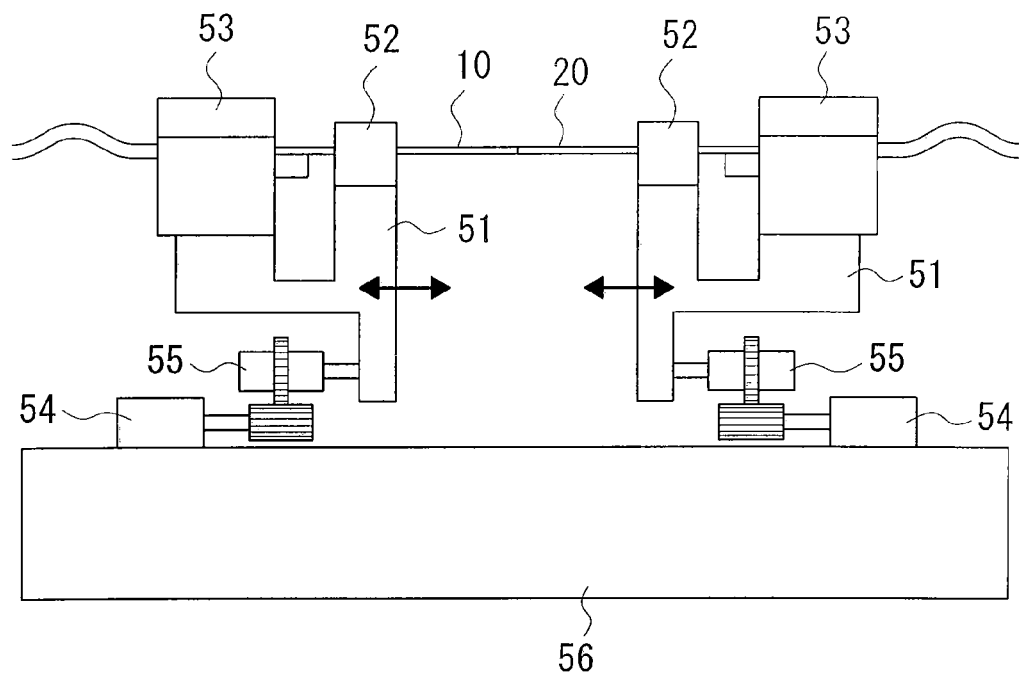
FIG. 2 is a side view showing a specific example of the V groove block and the holding mechanism thereof.

As is shown in FIG. 2, the V groove blocks 52 are mounted on the moving blocks 51. In addition, sheath clamps 53 are mounted on the moving blocks 51. The sheath clamps 53 are used to clamp the sheaths (i.e. protective membranes) of the optical fibers 10 and 20 so as to fix them in place. The moving blocks 51 are moved either towards or away from each other in the axial direction of the optical fibers 10 and 20 (i.e. the Z axial direction), as is shown by the arrows, by a drive transmission mechanism such as micrometers 55 that convert rotation from motors 54 into rectilinear motion. Note that the moving blocks 51 are also able to be moved along the X axis and the Y axis, however, a description of those mechanisms is omitted here (neither are they illustrated in the drawings). A mechanism formed by the motors 54 and the like corresponds to drive device 35 shown in FIG. 1.

When splicing the two optical fibers 10 and 20, before they are set in the V groove blocks 52 and clamped by the sheath clamps 53, in other words, in a state in which the optical fibers are outside the discharge area, high voltage is applied from the discharge power supply device 36 to the discharge electrodes 41 and 42 so as to generate an arc discharge (note that this arc discharge when the optical fibers are not present will hereafter be referred to as a preliminary arc discharge). As a result of this preliminary arc discharge, as is shown in FIG. 3, a discharge beam 43 is formed between the discharge electrodes 41 and 42.

Figure 3:
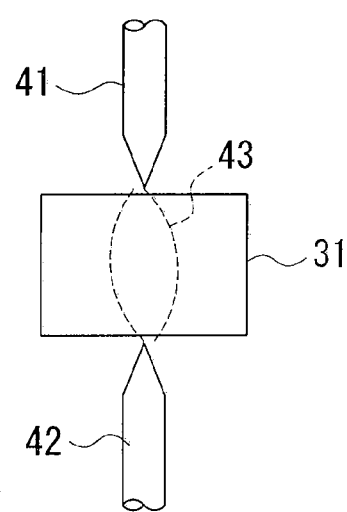
FIG. 3 is a front view schematically showing a discharge beam and image pickup area during a preliminary discharge.
Figure 4:
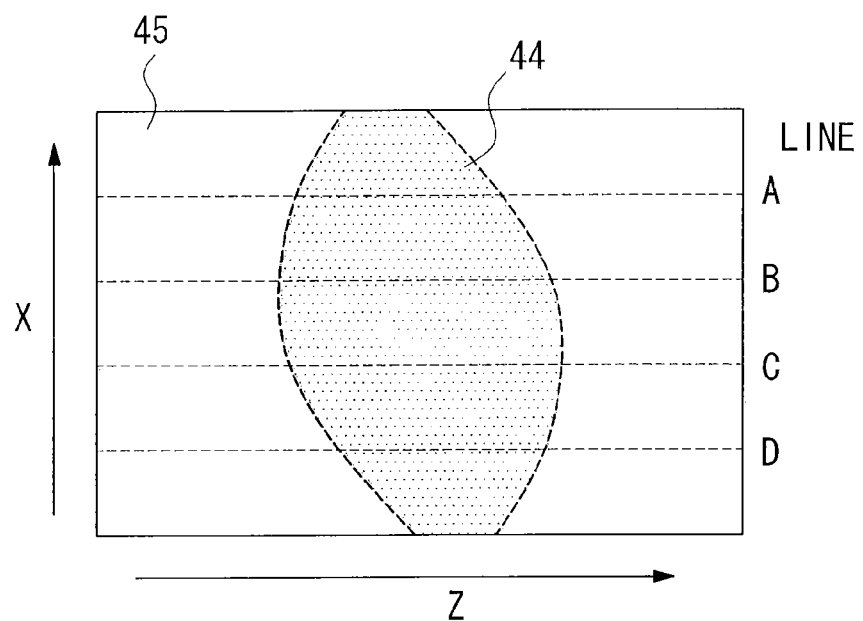
FIG. 4 is a view showing a discharge beam image appearing on a image plane and lines for measuring brightness distribution.

The image pickup area (i.e. the image pickup field of view) 31 of the TV camera 32 is as is shown in FIG. 3 for example, and an image of the discharge beam 43 is picked up in the image pickup area 31. The image output from the TV camera 32 is fed to the image processing device 33, and an image of the discharge beam 44 appears on an image plane 45 of an (unillustrated) monitor device provided with the image processing device 33 (alternatively, in the control device 34), as is shown in FIG. 4. On this image plane 45, for example, the vertical direction represents the X direction in the image pickup space, while the horizontal direction represents the Z direction in the image pickup space. The image processing device 33 estimates brightness distributions on a plurality of (four in this example) lines A, B, C, and D in the Z direction that are set at different positions in the X direction. The brightness distributions that are thus estimated are shown by the curves a, b, c, and d in FIG. 5. The curves a, b, c, and d correspond respectively to the lines A, B, C, and D.

Here, the X direction is the direction of a straight line joining the discharge electrodes 41 and 42, while the Z direction is the direction cutting across this straight line at a right angle. Therefore, as is shown in FIG. 4, even if the discharge beam image 44 is slanted, it is possible to estimate the slant from the brightness distributions a to d on the plurality of lines. Moreover, regardless of where the position in the X direction of the optical fibers 10 and 20 that are being abutted against each other is located, it is possible to estimate where the brightness peak, namely, the center of the heating is in the Z direction on the same X coordinates.

After the center of heating has been estimated in this way, the two optical fibers 10 and 20 being spliced are set. The sheaths of the end portions of the two optical fibers 10 and 20 are peeled off and the optical fibers 10 and 20 that have been placed in their core conductor state are set in the V groove blocks 52 and 52. The sheath portions thereof are then fixed by the sheath clamps 53 and 53. Next, using images obtained from the TV camera 32, for example, the positions of the moving blocks 51 and 51 in the X and Y directions are adjusted by the control device 34 controlling the drive device 35 such that the axes of the abutting optical fibers 10 and 20 are placed in alignment. In addition to this axial center alignment, the control device 34 adjusts the position in the Z direction using the above described center of heating information such that the abutment portion is positioned in the center of the discharge beam and the discharge beam is applied equally to both of the optical fibers 10 and 20.

When the position adjustment is completed, under the control of the control device 34 the discharge power supply device 36 applies high voltage to the discharge electrodes 41 and 42 thereby heating the abutment portion of the optical fibers 10 and 20. Because the position in the Z direction has been adjusted such that the abutment portion is positioned in the center of heating of the discharge beam 43, the two optical fibers 10 and 20 are heated equally with a high degree of reliability providing an excellent fusion splicing with a low splice loss.

Note that, at the time of the arc discharge for the fusion splicing (hereafter be referred to as a main arc discharge), the optical fibers 10 and 20 are heated properly by adjusting the discharge power by increasing the discharge current and the like. Therefore, generally, during this main arc discharge the control device 34 controls the discharge power supply device 36 such that the discharge current is greater than for the preliminary arc discharge. In other words, the discharge current during the preliminary arc discharge is normally controlled so as to be smaller than the discharge current for the main arc discharge.

Figure 5:
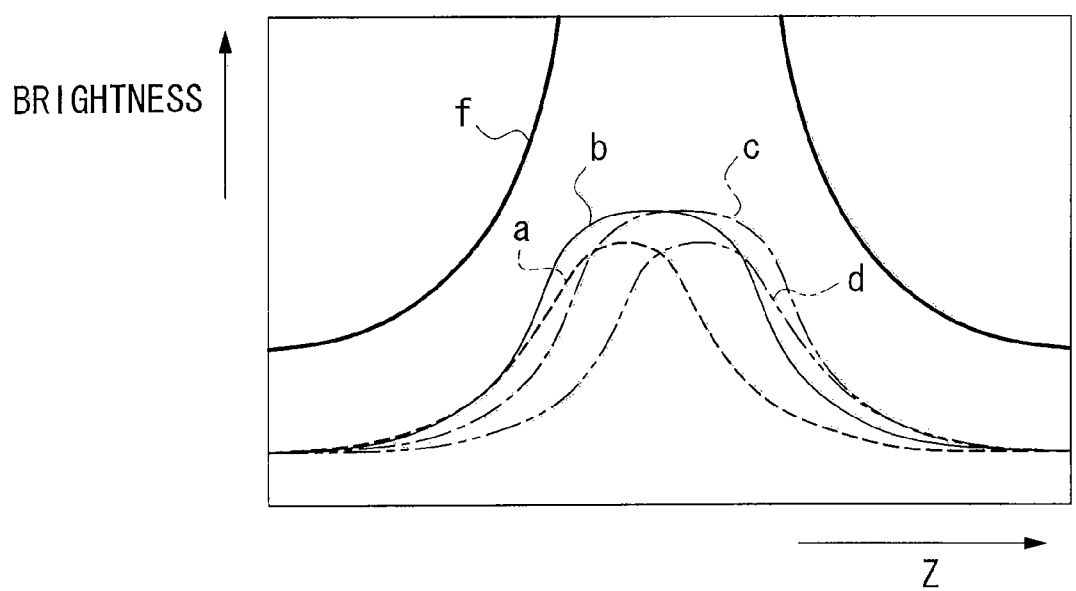
FIG. 5 is a graph showing the brightness distribution on each line

This is for the following reason. As described above, the preliminary arc discharge is performed in order to estimate the brightness distribution and as a result the center of heating. Therefore, it is necessary to obtain an unsaturated brightness distribution that allows a peak position to be estimated with ease. Lf the discharge current for the preliminary arc discharge is too great making the brightness too great so that only a saturated brightness such as that shown by the curve f in FIG. 5 is be obtained, it becomes difficult to estimate the peak position. Therefore, in order to estimate a brightness distribution contained exactly within the dynamic range of the brightness of the image signal processing system, it is necessary to reduce the discharge current. In contrast, because the main arc discharge is performed in order to fusion splice the optical fibers, it is normal to adjust the discharge current so that it provides sufficient power and amount of heating. The discharge intensity during the main arc discharge is set to the optimum value (i.e. discharge current value) to give the least splice loss. Although this optimum discharge intensity is changed by the type of optical fibers being spliced and the state of the electrodes 41 and 42, and normally it is greater than the discharge intensity for the preliminary arc discharge.

When an experiment was performed to actually splice single mode optical fibers using a single core optical fiber fusion splicer, the optimum discharge current for the main arc discharge varied in this experiment between approximately 12.3 mA and 13.2 mA, however, a suitable brightness distribution in a range in which there was no saturation was obtained when the discharge current for the preliminary arc discharge was fixed to 12.3 mA.

In the above description, the center of the discharge beam and heating center are estimated from the brightness distribution on a plurality of lines, however, because the brightness distribution is estimated on a plurality of lines having different positions, it is also possible to estimate the shape of the discharge beam and thus detect any abnormality therein. Namely, the estimation of the brightness distributions a, b, c, and d on the lines A, B, C, and D that are in different positions in the X direction means that the brightness distribution in the X direction is also estimated. This enables the shape of the discharge beam 43 in the Z—X direction to be estimated. As a result, it is possible to estimate abnormalities in the discharge beam 43 by detecting states in which the discharge beam 43 is overly slanted or in which partial low brightness spots are generated. Accordingly, it is easy to decide whether or not maintenance such as replacing the electrodes 41 and 42 or cleaning the discharge electrodes 41 and 42 in order to remove dust or the like is necessary.

The TV camera 32 is normally provided in order to align the axes (i.e. adjust the cores) of the optical fibers 10 and 20. Namely, although omitted from the drawings, a light source is disposed facing the TV camera 32 and sandwiching the abutment portion of the optical fibers 10 and 20 that are set in position between itself and the TV camera 32. The TV camera 32 is used to pick up a lateral transmission image obtained when light from this light source passes through the optical fibers 10 and 20. Whether or not the axial centers of both distal ends of the optical fibers 10 and 20 that are set in position are aligned is observed using this transmission image. In accordance with the result of this, the drive device 35 is controlled by the control device 34 and the moving blocks 51 and 51 are moved such that the axial centers are aligned. Therefore, the image pickup area 31 is not normally large enough to be able to pickup an image of the distal ends of the discharge electrodes 41 and 42, as is shown in FIG. 3, however, it is sufficiently large to pick up an image of the discharge beam 43. Therefore, by employing an image pickup system that is provided in this way in a normal optical fiber fusion splicer, it is possible to estimate the center of heating and discover any abnormalities in the discharge beam. As a result, the fact that the present invention can be applied without greatly altering the structure of an existing optical fiber fusion splicing device is a major advantage with the present invention Note that the above described structure relates to one example in order to simplify the explanation and it is to be understood that a variety of specific structures are possible in addition to that described above. For example, in the above description, the optical fibers 10 and 20 are not set prior to the preliminary arc discharge, however, it is also possible for the optical fibers 10 and 20 to be set using the V groove blocks 52 and the sheath clamps 53 and to simply move them backwards so that the distal ends of the optical fibers 10 and 20 are removed away from the discharge area. Furthermore, four lines are used to estimate the brightness distribution, however, the number is not limited to four and it is possible to use a great many more than this number. Furthermore, in the above description and drawings, the number of optical fibers that are set is one each on the left and right sides, however, it is also possible for the present invention to be applied to a multicore optical fiber fusion splicer that splices together a plurality of optical fibers in a collective fusion splicing. In addition, various alterations are possible insofar as they do not depart from the scope of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A discharge beam estimating method, wherein in an optical fiber fusion splicer comprising; a setting means for setting respective end surfaces of two optical fibers that are to be spliced in order to abut against each other, and a heating means for generating an arc discharge between two discharge electrodes and heating an abutment portion of the optical fibers using a discharge beam; and the method comprising the steps of:

picking up an image of the arc discharge generated between the discharge electrodes when no optical fibers have been placed in a discharge area;

estimating brightness distributions on a plurality of lines that are set at different positions along a rectilinear direction between the discharge electrodes and run in a direction substantially at right angles to the rectilinear direction on the image; and estimating a discharge beam shape from the plurality of brightness distributions.

\* \* \* \* \*